United States Patent
Liu et al.

(10) Patent No.: US 7,026,800 B2
(45) Date of Patent: Apr. 11, 2006

(54) FEED-FORWARD METHOD FOR IMPROVING A TRANSIENT RESPONSE FOR A DC—DC POWER CONVERSION AND DC—DC VOLTAGE CONVERTER UTILIZING THE SAME

(75) Inventors: Jing-Meng Liu, Hsinchu (TW);
Liang-Pin Tai, Tainan (TW);
Der-Jiunn Wang, Hsinchu (TW)

(73) Assignee: Richtek Technology Corp., Hsinchu (TW)

( * ) Notice: Subject to any disclaimer, the term of this patent is extended or adjusted under 35 U.S.C. 154(b) by 237 days.

(21) Appl. No.: 10/683,395

(22) Filed: Oct. 14, 2003

(65) Prior Publication Data
US 2004/0076024 A1    Apr. 22, 2004

Related U.S. Application Data

(60) Provisional application No. 60/418,706, filed on Oct. 17, 2002.

(51) Int. Cl.
*G05F 1/40* (2006.01)
*H02M 1/12* (2006.01)

(52) U.S. Cl. ..................................... 323/270

(58) Field of Classification Search .................. 363/40, 363/41, 43; 323/268, 270, 271, 273, 275, 323/282, 285
See application file for complete search history.

(56) References Cited

U.S. PATENT DOCUMENTS

| | | | | |
|---|---|---|---|---|
| 5,208,485 A | * | 5/1993 | Krinsky et al. | 307/41 |
| 5,956,246 A | * | 9/1999 | Sequeira et al. | 363/144 |
| 6,437,462 B1 | * | 8/2002 | Maple et al. | 307/75 |

* cited by examiner

*Primary Examiner*—Matthew V. Nguyen
(74) *Attorney, Agent, or Firm*—Rosenberg, Klein & Lee (57) ABSTRACT

In a method for a DC-DC power conversion performed by a switching mode buck voltage converter, the power conversion is split into two or more stages, and a feed-forward signal is generated by one of the stages and sent to another stage prior thereto. The feed-forward signal is generated by responding to a load current transient, such as output voltage drop, ON-duty increment or decrement occurred in the PWM control loop, error amp output swinging, and any other detectable signals in response to load current transient of the voltage converter. As a result, the performance of the DC-DC voltage converter is improved due to the prior stage modulated early in time, and both lower ripple current and peak current in steady state operations and fast response to load current transient conditions could be simultaneously obtained.

28 Claims, 12 Drawing Sheets

FEED-FORWARD METHOD FOR IMPROVING A TRANSIENT RESPONSE FOR A DC—DC POWER CONVERSION AND DC—DC VOLTAGE CONVERTER UTILIZING THE SAME

REFERENCE TO RELATED APPLICATIONS

This Patent Application is based on Provisional Patent Application Ser. No. 60/418,706, filed 17 Oct. 2002.

FIELD OF THE INVENTION

The present invention relates generally to an apparatus and method for DC-DC power conversion, and more particularly, to a transient response improvement for a DC-DC voltage converter.

BACKGROUND OF THE INVENTION

DC-DC Power Conversion

For a DC-DC power conversion, switching mode buck voltage converter is typically used to convert an input voltage from a power supply to a converter output voltage that is connected to a load such as a central processing unit (CPU). For the converter to have better performance as well as to reduce the voltage difference between the input voltage and the converter output voltage, multi-phase or multi-channel scheme is employed thereof, by which the input current from the power supply is spilt into a plurality of channel currents. For examples of such system, readers are referred to U.S. Pat. No. 6,278,263 issued to Walters et al. and U.S. Pat. No. 6,414,470 issued to Liu et al.

Basic Scheme

Figure 1:
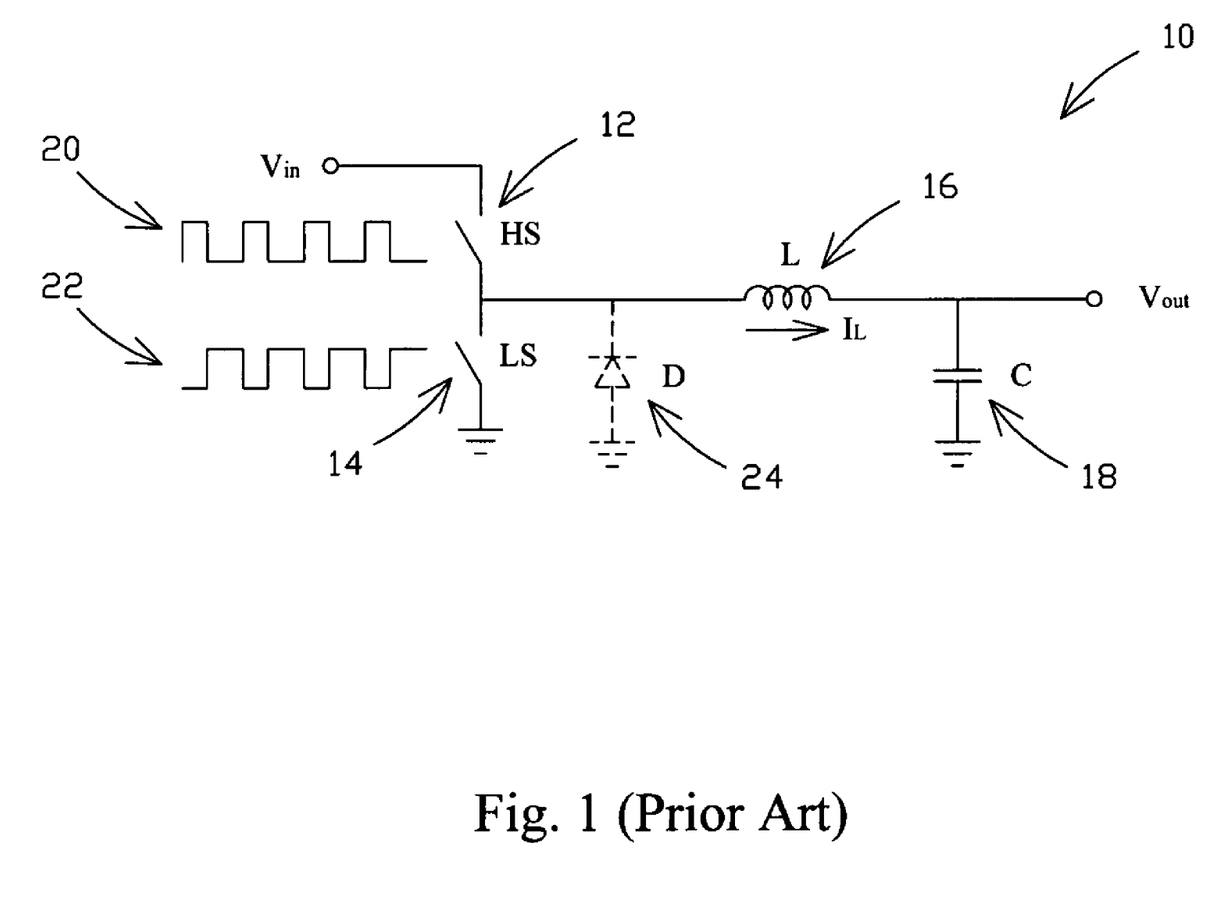
FIG. 1 shows a typical DC-DC power conversion scheme.

Further to the above introduction to DC-DC power conversion, a circuit 10 is provided in FIG. 1 to show a simplified single-channel or single-phase voltage converter or one channel of a multi-phase or multi-channel voltage converter to illustrate the basic principles of the power conversion thereof, which is also known as the switching mode buck voltage converter, and by which a converter output voltage $V_{out}$ is generated from a power source or supply voltage $V_{in}$ under the conversion that alternatively switches high-side and low-side switches 12 and 14, such as MOS transistors, to regulate its output $V_{out}$ in conjunction with an output inductor 16 and an output capacitor 18. The high-side and low-side switches 12 and 14 are alternatively turned on and off by a clock 20 and its complementary signal 22 whose ON-duty is determined in accordance with the ratio of the output voltage to the input voltage of the converter, i.e., $V_{out}/V_{in}$. During the ON-duty of the clock 20, the high-side switch 12 is turned on and the low-side switch 14 is turned off. In contrast, during the OFF-duty of the clock 20, the high-side switch 12 is turned off and the low-side switch 14 is turned on. By this manner the desired converter output voltage $V_{out}$ is obtained and a current $I_L$ is supplied to the load through the inductor 16.

It is also shown in FIG. 1 a diode 24 with dashed line to replace the low-side switch 14 in some other applications, e.g., asynchronous voltage regulator. However, the principles of the power conversion are the same for such modifications.

Performance

Figure 2:
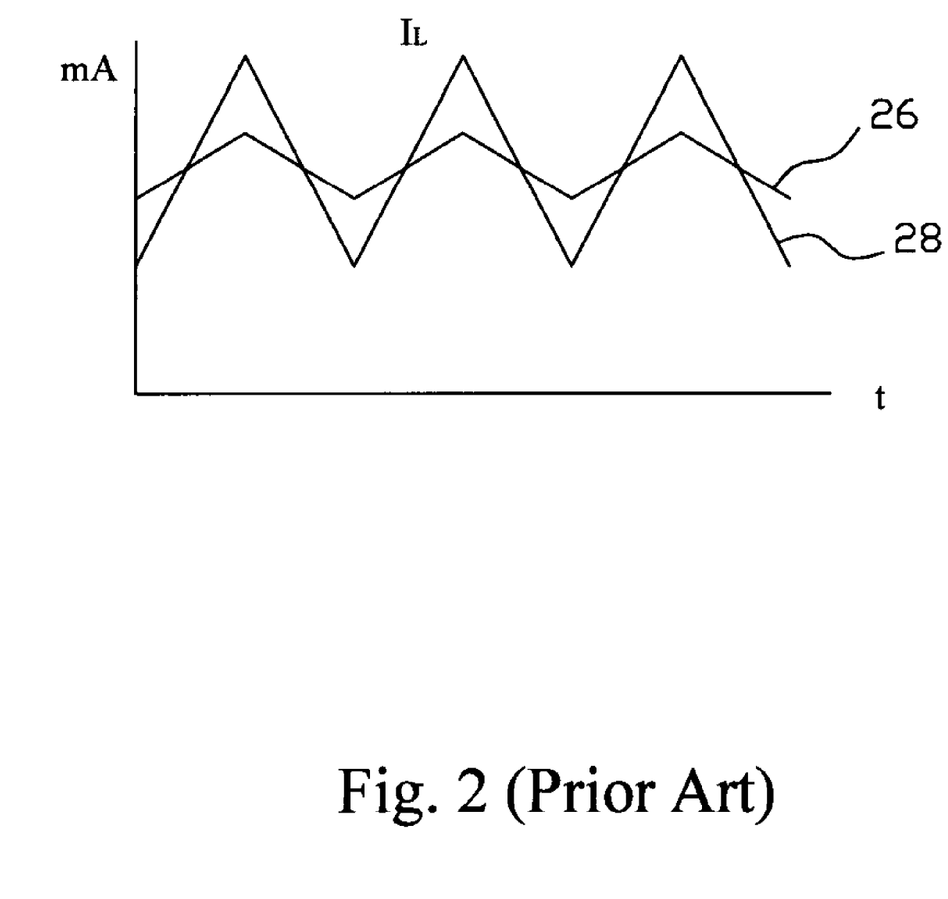
FIG. 2 shows the relationship between the ripple current of the steady state and the inductor L in the power conversion scheme of FIG. 1.

In the conversion system 10 shown in FIG. 1, since the inductor 16 is inserted between the converter output $V_{out}$ and the switches 12 and 14, it will influence the performance of the converter output $V_{out}$, especially on the transient state operations. Ripple current and response speed are two most important factors to describe the system performance thereof. For the inductor 16, as shown in FIG. 2 by curves 26 and 28 for the steady state, a large inductance will result in a small ripple current (e.g., curve 26) and a small inductance will result in a large ripple current (e.g. curve 28). Apparently, a large inductance is better for the inductor 16 of the converter 10 shown in FIG. 1, since large ripple output is not preferred. However, large inductance inherently induces a slow response speed, which makes the load current IL fail to follow the load variations well and, as a result, the transient performance becomes poor. In some applications, e.g., voltage regulator for a CPU, the load may change suddenly or violently. In particular, a CPU needs only a tiny current when it is idle and drains a huge current when it becomes very busy. If a smaller output inductor is employed in the converter to obtain a fast response speed to the load current transient (LCT), the steady state performance will become very poor because of the large ripple current. Therefore, due to the output inductor, it is difficult to design a voltage converter in consideration of its steady state and transient state performance simultaneously, and trade-off is necessary no doubt.

Two-Step DC-DC Power Conversion

Figure 3:
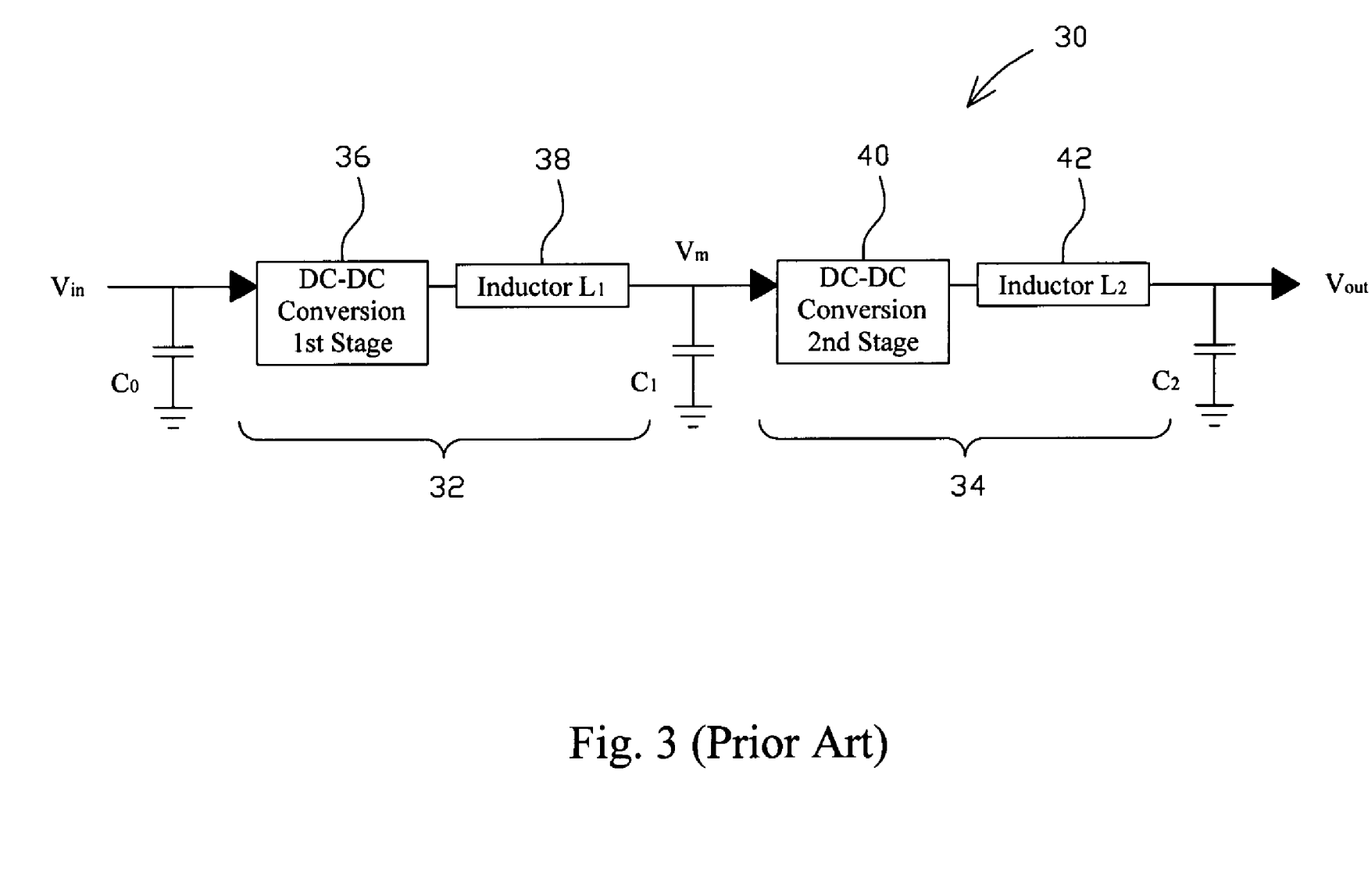
FIG. 3 shows a conventional two-step DC-DC power conversion scheme.

On the other hand, two-step DC-DC power conversion had been proposed to provide flexible design for the voltage converter since the ratio of $V_{out}/V_{in}$ in a two-step conversion becomes $(V_{out}/V_m) \times (V_m/V_{in})$ by splitting the conversion into two stages, as shown in FIG. 3, where $V_m$ is the modulated voltage between the two stages. In the converter system 30, for typical applications, the first stage 32 employs only a single-channel scheme for producing a suitable modulated voltage $V_m$ serving as the input voltage of the second stage 34, and the second stage 34 employs a multi-phase scheme to obtain excellent output performance. For ease of explanation, the inductors $L_1$ and $L_2$ are specially drawn out of the rest of the conversion stages hereinafter. Similar to an ordinary DC-DC voltage converter, e.g., the one shown in FIG. 1, the first stage 32 includes a DC-DC conversion 36 and an output inductor 38, and the second stage 34 includes a DC-DC conversion 40 and an output inductor 42. Each one of the DC-DC conversions in a two-step system, e.g., the block 36 or 40, includes one pair of switching MOS transistors for each channel and their control and driver circuit. Obviously, based on the two-step voltage converter 30, a DC-DC voltage converter configured with more stages could be achieved by splitting the power conversion into more stages between the input and output voltages $V_{in}$ and $V_{out}$, and the principles thereof remain the same.

The two-step DC-DC power conversion is also capable of minimizing the output ripple and reducing the LC value by splitting the power conversion into two stages, and optimizing the system performance of the second stage for that the second stage now needs only low-voltage devices and they have better response speed than high-voltage devices. An example of two-step DC-DC voltage converter is Taiwanese Pat. Application No. 091111366 issued to Dai et al. or its equivalent application, U.S. patent application under Ser. No. 10/442,077.

In the two-step conversion scheme 30 as shown in FIG. 3, the first stage 32 is so designed just for pre-modulating the voltage $V_m$, and the overall performance primarily depends on the second stage 34. In concerned with the system performance, a fundamental trade-off is made for setting each stage inductor value L as described in the following:

$$dI_L/dt = (1/L)(V_1 - V_2), \quad\quad 1.$$

where $V_1 - V_2$ is the voltage difference across the inductor L;

$$V_1 - V_2 = V_{in} - V_m \text{ for the first stage conversion } \mathbf{32}; \quad 2.$$

$$V_1 - V_2 = V_m - V_{out} \text{ for the second stage conversion } \mathbf{34}; \quad 3.$$

$$\text{ripple current } I_{ripple} = (1/L)(V_1 - V_2)(T_{on}); \text{ and} \quad 4.$$

$$\text{peak current } I_{peak} = I_{L(DC)} + (1/2)I_{ripple} = I_{L(DC)} + (1/2)(1/L)(V_1 - V_2)(T_{on}), \quad (5).$$

where $I_{L(DC)}$ is the DC component of the inductor current $I_L$ and $T_{on}$ is the "ON-time", or $T_{on} = D_{on}/F_s$, with $D_{on}$ denoting the ON-duty ratio and $F_s$ denoting the switching frequency.

It is further obtained two opposite conditions:
1. larger L and smaller ($V_1 - V_2$) will result in smaller ripple current and peak current in steady state, but slower $dI_L/dt$ response; and
2. smaller L and larger ($V_1 - V_2$) result in faster $dI_L/dt$ response, but larger ripple current and peak current in steady state.

However, what is desired is "fast $dI_L/dt$ response when loading current is changing and low peak current in steady state operations". Recently, the load transient ($dI_L/dt$) is getting more and more critical for various applications, such as in CPU power supplies.

PWM Control Loop

Figure 4:
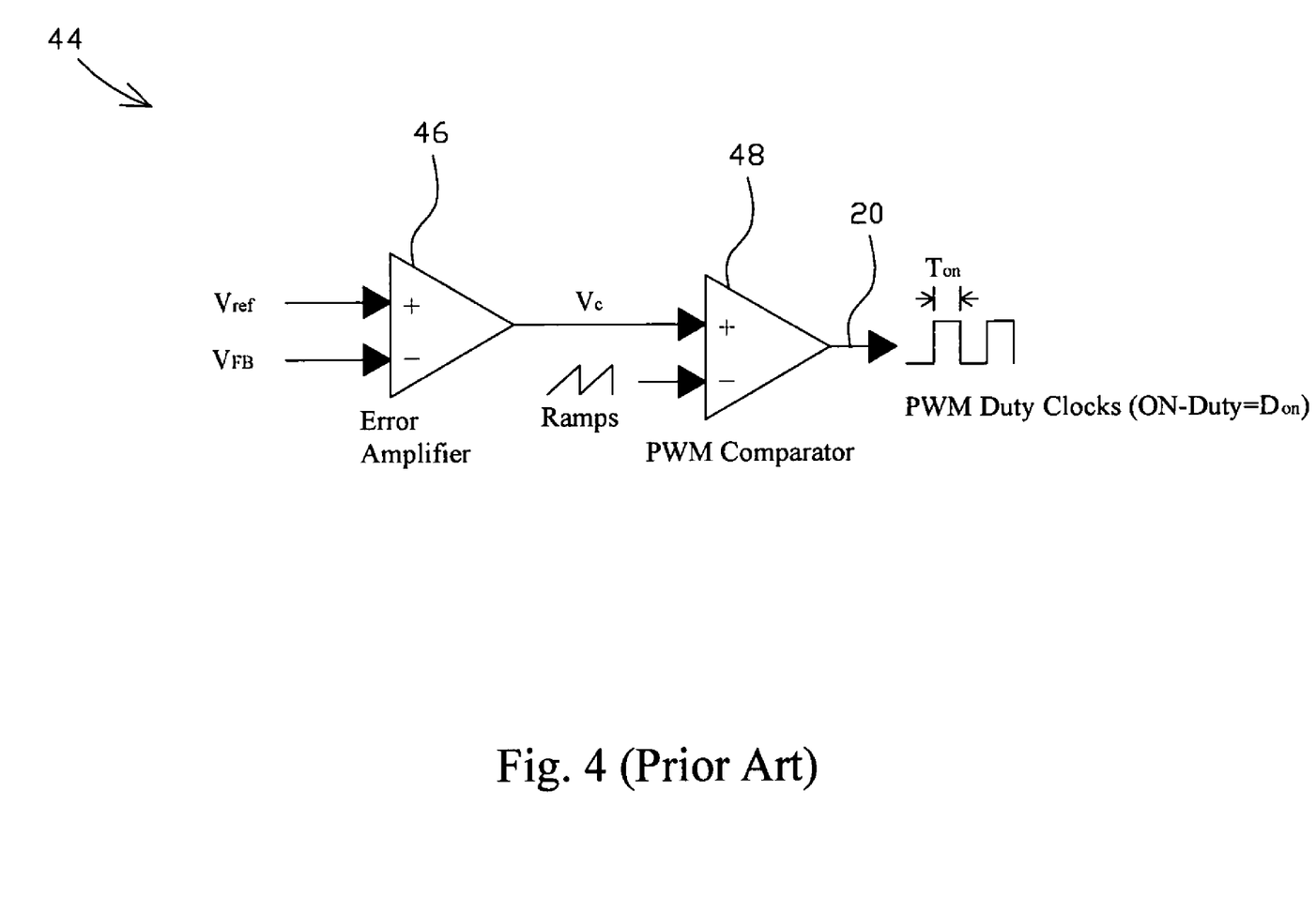
FIG. 4 shows a typical PWM control loop for a DC-DC voltage converter.

As is well known, the high-side and low-side switches 12 and 14 in FIG. 1 are alternatively switched by the clock 20 that is generated by pulse width modulation (PWM) method, which is shown in FIG. 4. In such a PWM generator 44, an error amplifier 46 compares a signal $V_{FB}$ representative of the converter output voltage $V_{out}$ with a reference voltage $V_{ref}$ so as to generate an error amp output $V_c$. The error amp output $V_c$ is further compared with a ramp signal Ramps by a PWM comparator 48 so as to generate the clock 20 whose ON-duty $D_{on}$ is under controlled and to regulate the converter output voltage $V_{out}$ to a desired value. In other words, the converter output voltage $V_{out}$ can be controlled by adjusting the ON-duty $D_{on}$ or the ON-time $T_{on}$, and which can be implemented by combining a signal representative of tuning of the ON-duty $D_{on}$ or the ON-time $T_{on}$ with $V_{ref}$, $V_{FB}$, $V_c$, or Ramps.

However, even though there are several control methods to tune the ON-duty and OFF-duty of the high-side and low-side switches 12 and 14 for the DC-DC voltage converter 10, the response speed to the load variations is always degraded by the stage delay in a two-step conversion system 30, since it is split into a two-stage mechanism. More specifically, referring to FIG. 3, the first and second stages 32 and 34 in the two-step voltage converter 30 have their respective PWM controls, i.e., the one in the first stage 32 modulates the voltage $V_m$, and the other in the second stage 34 regulates the output $V_{out}$. When a load current transient is occurred, the PWM control loop in the second stage 34 responds thereto first in order to maintain the converter output voltage $V_{out}$ as stable as possible, which subsequently results in a transient impact to the modulated voltage $V_m$ and thereby induces the PWM control loop in the first stage 32 to respond thereto further. Due to such a back-forward control scheme, the response speed of the whole system always fails to follow the load current transient in time.

Therefore, it is desired a method and apparatus to improve the response speed of a DC-DC voltage converter that employs a conversion scheme of two or more stages.

SUMMARY OF THE INVENTION

An object of the present invention is to provide a DC-DC voltage converter and conversion method by which small ripple and peak currents and quick response to load current transient can be obtained simultaneously.

Another object of the present invention is to provide a DC-DC converter and conversion method which results in a lower ripple current and peak current in steady state operations and fast response in load current transient conditions.

In a method for a DC-DC power conversion, according to the present invention, the power conversion is split into two or more stages, and a feed-forward signal is generated by one of the stages and sent to another stage prior thereto. The feed-forward signal is generated by responding to a load current transient, such as output voltage drop, ON-duty increment or decrement occurred in the PWM control loop, error amp output swinging, and any other detectable signals in response to the load current transient, and by which the prior stage responses early in time. As a result, the system performance is improved.

It is also disclosed a DC-DC voltage converter which comprises two or more stages connected in series between an input voltage and a converter output, each of the stages performing a DC-DC buck voltage conversion. To improve the DC-DC voltage converter, a feed-forward signal is generated by one of the stages and sent to another stage prior thereto, and the feed-forward signal is generated by responding to a load current transient, such as output voltage drop, ON-duty increment or decrement occurred in the PWM control loop, error amp output swinging, and any other detectable signals in response to the load current transient. As a result, the performance of the DC-DC voltage converter is improved due to the prior stage responding early in time.

In a preferred embodiment, the feed-forward signal is the PWM signal or its ON-duty in the last stage.

In another preferred embodiment, the feed-forward signal is the error amp output in the last stage and is generated by comparing a signal representative of the converter output voltage with a reference voltage.

In a further preferred embodiment, the feed-forward signal is a signal representative of the converter output voltage to detect the output voltage drop thereof.

Several circuits are provided for the feed-forward signal to be combined with the other signals in the PWM control loop of the prior stage to adjust the ON-duty thereof for modulating the prior stage.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAIL DESCRIPTION OF THE INVENTION

A feed-forward method is proposed to create a new benefit that results in much better $dI_L/dt$ response. Specifically, the present invention provides a method and apparatus directed to both lower ripple current and peak current in steady state operations and fast $dI_L/dt$ response in load current transient conditions for a DC-DC voltage converter.

Principles of the Design Rule

According to the present invention, a DC-DC voltage converter with both fast load current transient response and low ripple current and peak current is achieved by the following steps.

1. Properly setting the modulated voltage $V_m$ and the inductor $L_2$ of the second stage so that the ripple current and peak current of the second stage, i.e., $(1/L_2)(V_m-V_{out})(T_{on})$ and $I_{L(DC)}+(1/2)(1/L_2)(V_m-V_{out})(T_{on})$, are in respective acceptable ranges.

2. When the load current $IL_2$ suddenly increases, the second stage will respond against the $V_{out}$ drop. However, the fastest response is physically limited by $dI_{L2}/dt$ capability, that is, the inductor $L_2$ and $(V_m-V_{out})$ value.

3. When the second stage is responding against the $V_{out}$ drop, it generates obviously detectable signals at the same time, such as the "ON-duty increasing", "error amp output ($V_c$) swinging", . . . etc.

4. By some circuit, one or more of the "signals from the responding second stage" are selected to feed forward to the first stage to modulate (i.e., pull up or pull down) $V_m$ immediately, so that the enlarged $\Delta V_2$ ($=V_m-V_{out}$) improves $dI_{L2}/dt$ capability of the second stage.

5. Alternatively, the utilization of "$V_{out}$ drop" itself to feed forward to the first stage is also applicable, although such signal is often much smaller and more difficult to be quickly detected.

6. As mentioned, the second stage can be single phase or multi-phase depending on applications. When a multi-phase scheme is employed, it is just to "equivalently OR up" all the signals of each phase to feed forward to the first stage, since anyone phase of the second stage in response means that the whole system is in response and the earliest signal should be taken for achieving fastest $dI_{L2}/dt$ response. Any other such topologies and the like or modifications should be also included in the present invention.

FIRST EMBODIMENT ON-Duty Feed-Forward (ODFF) Method

Figure 5:
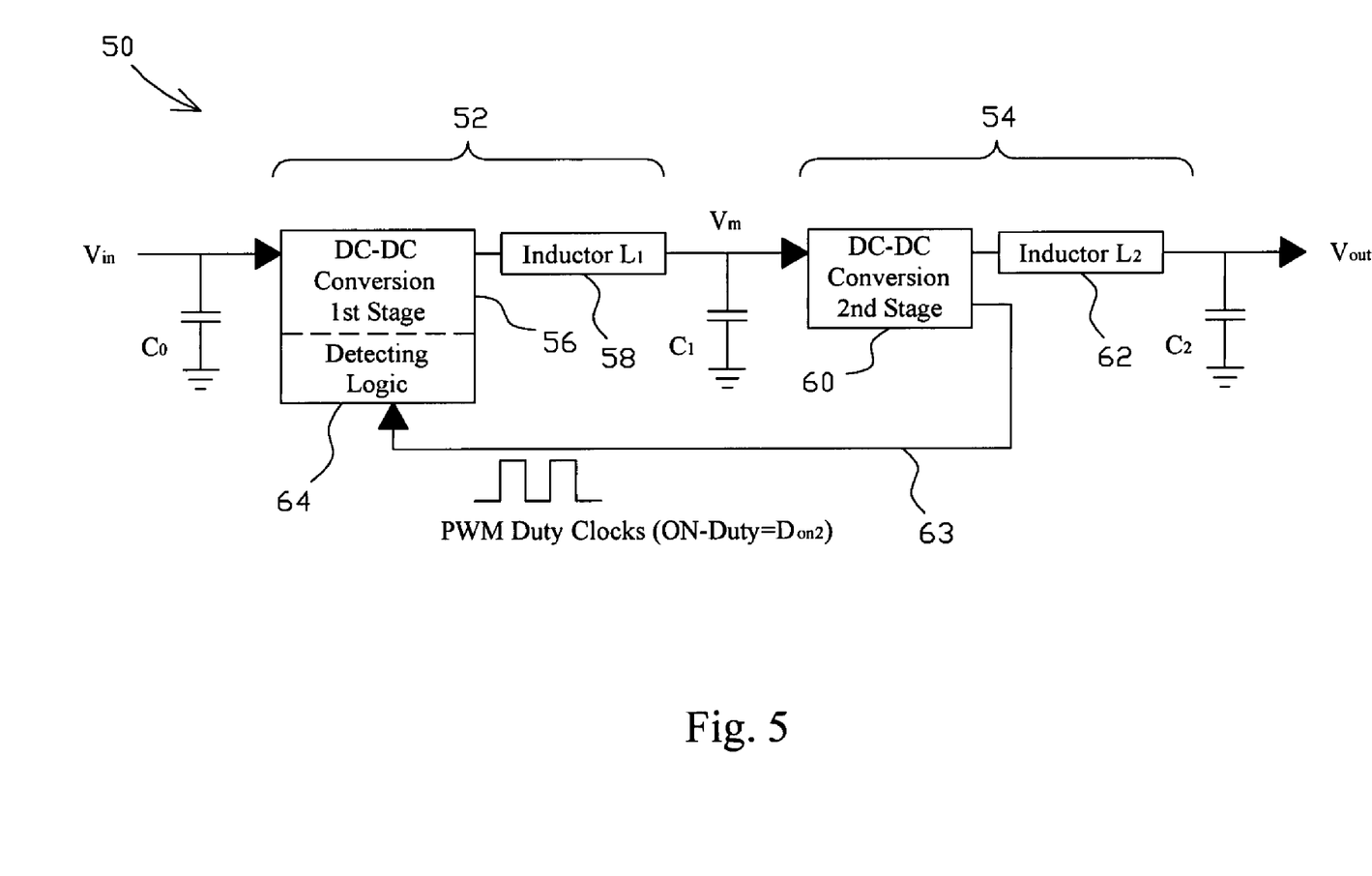
FIG. 5 illustrates an ON-duty feed-forward method according to the present invention.

The value of the ON-duty of the second stage is fed back directly to the first stage to adjust the modulated voltage $V_m$, as shown in FIG. 5. In this DC-DC voltage converter 50, two DC-DC conversion stages 52 and 54 are connected in series between an supply voltage $V_{in}$ and the converter output $V_{out}$, and these two stages 52 and 54 may be substantially the same with prior arts such as illustrated in FIGS. 1–4 and their details are omitted herein. Briefly, the first conversion stage 52 includes a switching mode buck voltage converter circuit to convert the input voltage $V_{in}$ to the modulated voltage $V_m$. This stage 52 can be configured in single phase or multi-phase, and the single-phase scheme is preferred for saving cost. For illustration, it can be configured in the manner shown in FIG. 1, only that the output of the first stage 52 is the modulated voltage $V_m$. Likewise, the PWM control loop shown in FIG. 4 is applicable to generate the PWM control signal 20 to manipulate the high-side and low-side switches 12 and 14. The second conversion stage 54 also includes a switching mode buck voltage converter circuit to convert the modulated voltage $V_m$ to the converter output voltage $V_{out}$, preferably configured in multi-phase scheme to have better performance. For simplicity, this embodiment converter 50 is so designed similar to that shown in FIG. 3, and, similarly, the inductors $L_1$ and $L_2$ are specially drawn out of the rest of the conversion stages 52 and 54 to simplify the explanation hereinafter. That is, in the first stage 52, the switching circuit and its control and driver circuit are integrated in the block 56 and its output inductor $L_1$ is referred as block 58, and likewise, the switching circuit and its control and driver circuit of the second stage 54 are integrated in the block 60 and its output inductor $L_2$ is denoted with block 62. To improve the system performance, however, the PWM duty clocks 63 of the second conversion stage 54 are further sent to the first conversion stage 52, and the latter additionally includes a detecting logic 64 to sense the PWM duty clocks 63 so as to respond to the load current transient and thereby to modulate its output $V_m$ in time. As a result, the response speed of the whole system 50 becomes more fast.

For the feed-forward signal or cross-stage signal, the PWM duty clocks 63 of the second conversion stage 54 are drawn out from the PWM control loop of the second conversion stage 54. For example, when the circuit 44 shown in FIG. 4 is applied in the second conversion stage 60 of FIG. 5, the PWM duty clocks 63 of FIG. 5 are derived from the output 20 of FIG. 4. Furthermore, if multi-phase conversion scheme is employed in the second conversion stage 60 of FIG. 5, then the PWM duty clocks 63 of FIG. 5 will be replaced with all PWM control signals derived from all phases of the second conversion stage 60 and they will be all equivalently ORed together.

Detecting Logic

Figure 5A:
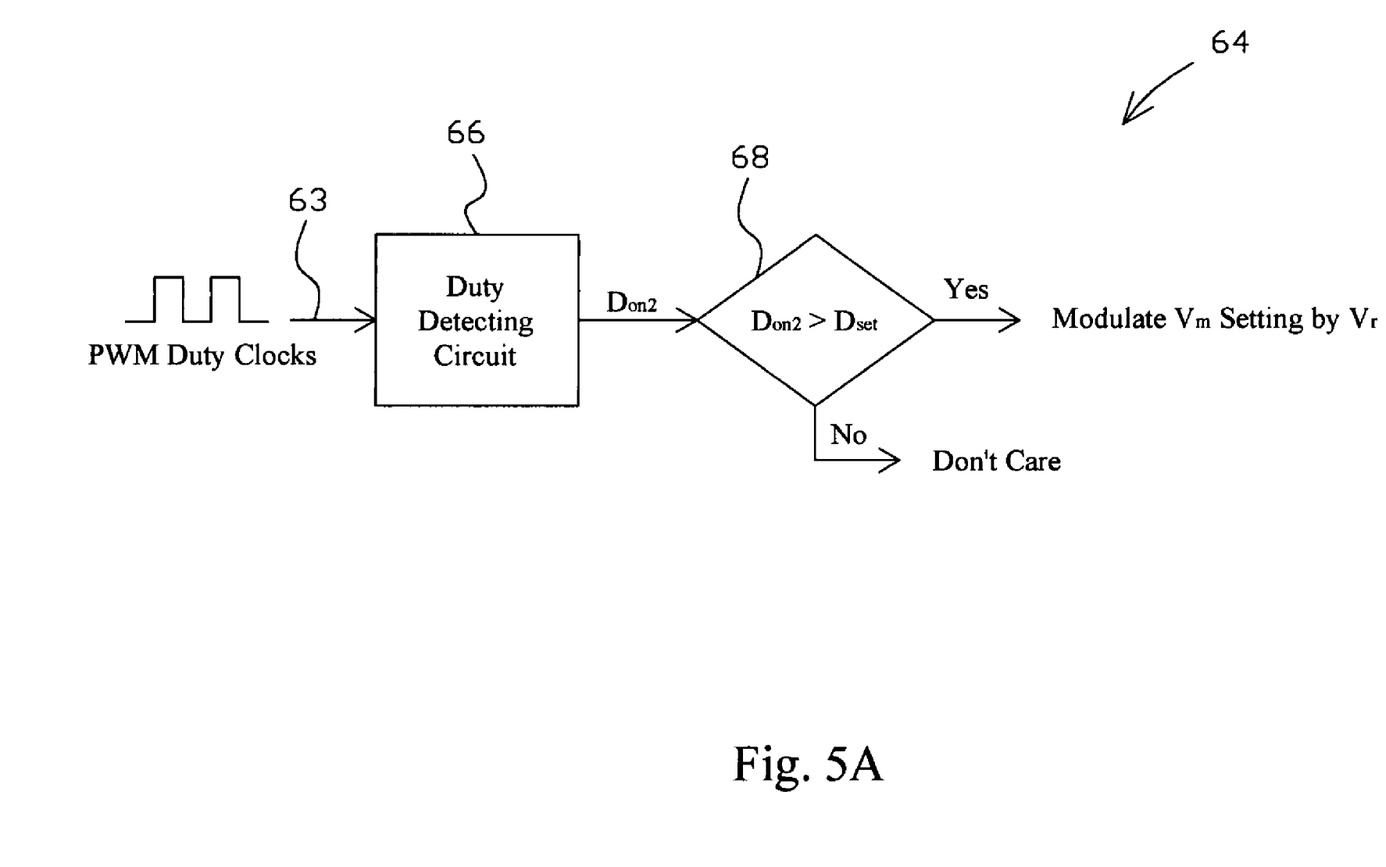
FIG. 5A shows an example of the detecting logic 64 in FIG. 5.

Function of the detecting Logic 64 is that "if $D_{on} \geq D_{set}$, then raise $V_m$ by $V_r$,", where $D_{set}$ can be easily set up from $V_m/V_{out}$ ratio for a reference by the theory of Volt-Second Balance such that $D_{on}$ will never reaches $D_{set}$ value in steady state operations and $D_{on}$ will suddenly run up over $D_{set}$ when $V_{out}$ drops. Moreover, the variation $V_r$ for the modulated voltage $V_m$ can empirically set up so that to meet $dI_{L1}/dt$ requirement with minimized impact to the control loop stability of the block 56. Further, methods to have multi-level detecting logic with multi-level settings of several $(D_{set1}, V_{r1})$, $(D_{set2}, V_{r2})$, . . . pairs may be utilized in the present invention.

Basically, the detecting logic 64 receives the PWM duty clocks 63 fed back from the PWM control loop coherently generated in the second conversion stage 60, and outputs the adjusting voltage $V_r$ to modify the modulated voltage $V_m$ of the first conversion stage 52. Specifically, the detecting logic 64 firstly detects the value of the ON-duty $D_{on}$ of the PWM duty clocks 63 and then compares the $D_{on}$ with the value or values of the reference $D_{set}$. FIG. 5A shows an example of the detecting logic 64 in FIG. 5. The ON-duty $D_{on2}$ of the second conversion stage 60 is detected and drawn from the PWM duty clocks 63 by a duty detecting circuit 66 to determine its value. This value, i.e., the ON-duty $D_{on2}$, is further compared with the threshold $D_{set}$ for example by a comparator in the next step 68 so as to determine a load current transient is happened to the converter output $V_{out}$ or not. If the $D_{on2}$ is larger than the $D_{set}$, then the output $V_m$ of the first conversion stage 52 is raised by a value of the voltage variation $V_r$; otherwise the detecting logic 64 will do nothing to the modulation of the output $V_m$ of the first conversion stage 52, i.e., there is no effect to the first conversion stage 52 by the PWM duty clocks 63. The reference value $D_{set}$ is set up in advance according to the $V_m/V_{out}$ ratio theoretically such that $D_{on2}$ will never reach $D_{set}$ in steady state operations and will suddenly run up over $D_{set}$ when the converter output voltage $V_{out}$ drops. The adjusting voltage $V_r$ could be properly determined by experience such that it could make the $V_m$ meet $dI_{L1}/dt$ requirement with minimized impact to the control loop stability when it is imposed on $V_m$. As a modification of the above embodiment, the above comparison principle could be multiplied. That is, the reference value $D_{set}$ could have several values such as $D_{set1}$, $D_{set2}$ and $D_{set3}$, and the voltage variation $V_r$ to be imposed on $V_m$ of the first conversion stage 52 could also have respective corresponding values. Thus, different complementary voltages with respect to different setting such as $(D_{set1}, V_{r1})$, $(D_{set2}, V_{r2})$, . . . could be obtained.

Second Embodiment Error Amp Output Feed-Forward (EAOFF) Method

Figure 6:
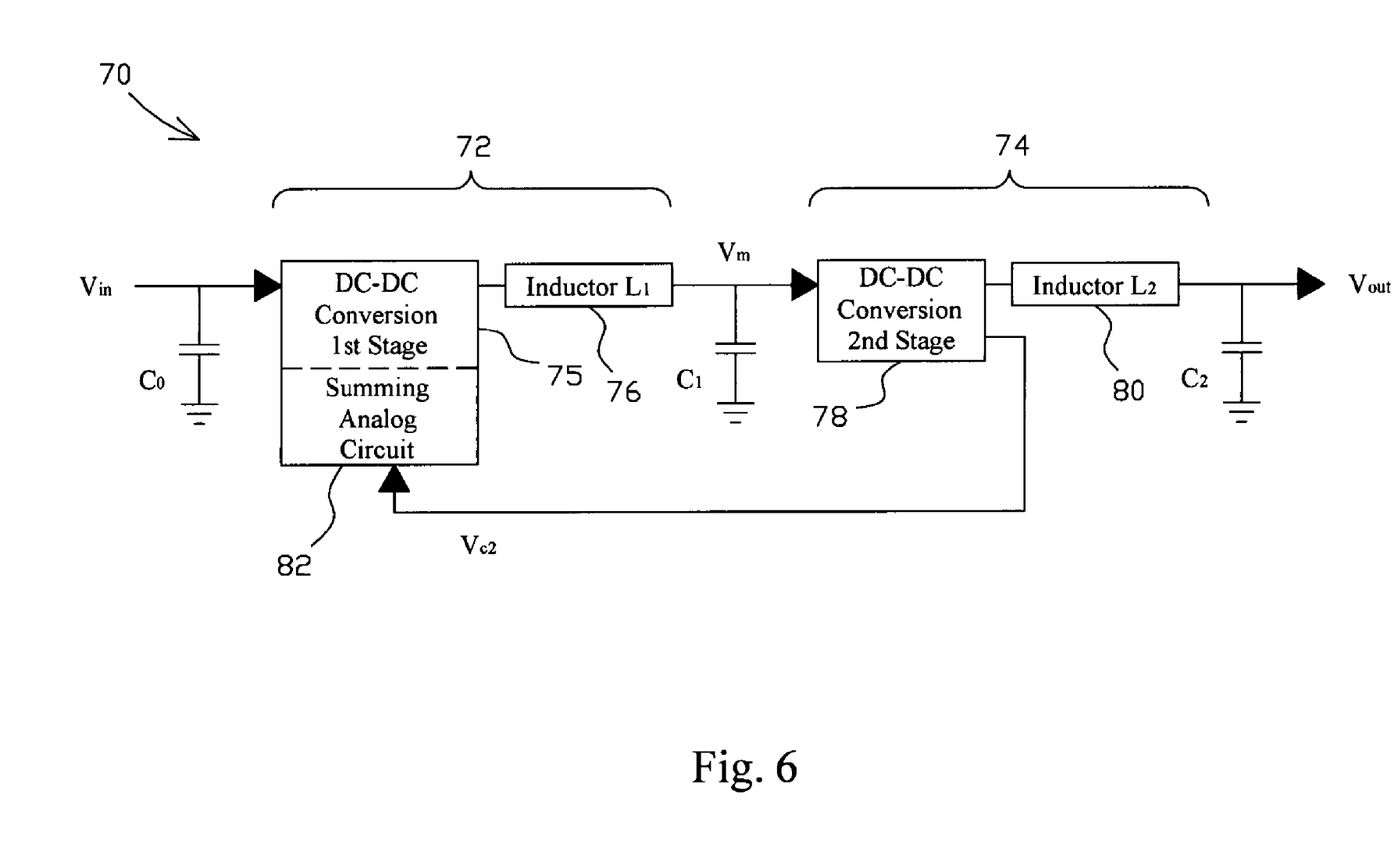
FIG. 6 illustrates an error amp output feed-forward method according to the present invention.

Alternatively, the response signal from the second stage 74 to modulate the first stage 72 in this embodiment is the error amplifier output $V_{c2}$, as shown in FIG. 6. Similar to that shown in FIG. 5, the present DC-DC voltage converter 70 is also designed as a two-step DC-DC power conversion herewith, i.e., the two conversion stages 72 and 74 are comprised thereof and connected in series between the input voltage $V_{in}$ and converter output $V_{out}$. Also, the first stage 72 includes an integrated block 75 and an output inductor 76, and the second stage 74 includes an integrated block 78 and an output inductor 80. The feed-forward signal or cross-stage signal $V_{c2}$ from the block 78 to the block 75 is the difference between a signal $V_{FB}$ representative of the converter output voltage $V_{out}$ and a reference voltage $V_{ref}$, and is received by a summing analog circuit 82 in the block 75. When the circuit 44 shown in FIG. 4 is applied in the block 78 of FIG. 6, the feed-forward signal $V_{c2}$ of FIG. 6 is derived from the output $V_c$ of the error amplifier 46 in FIG. 4.

Summing Analog Circuit

Figure 7:
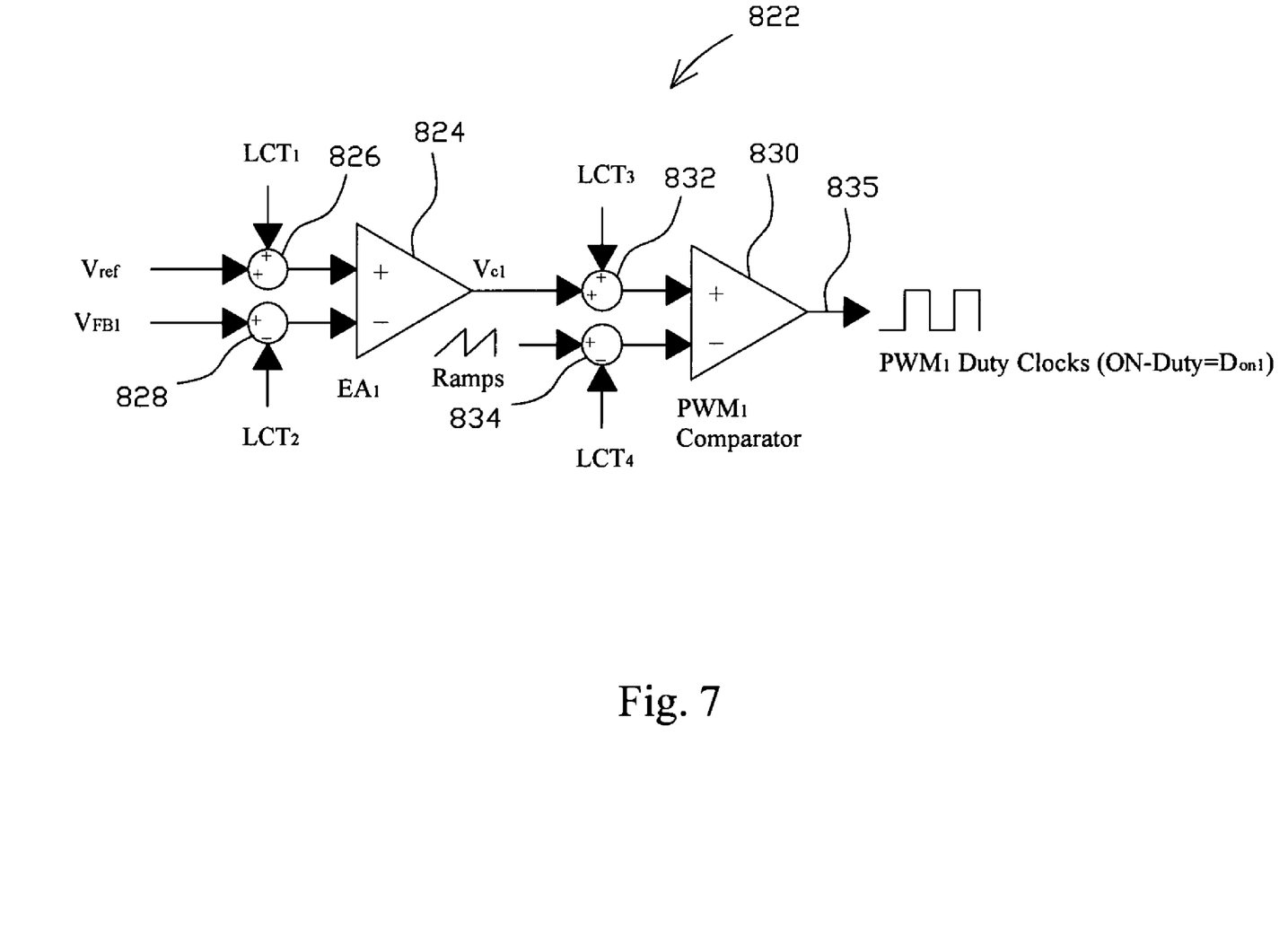
FIG. 7 shows a summing analog circuit for the system shown in FIG. 6.

Generally, the summing analog circuit 82 is the one that is obtained by modifying a typical PWM control loop such as shown in FIG. 4 with the feed-forward signal $V_{c2}$ resulted from the response of the second conversion stage 74, and could be in any forms. A first embodiment of the summing analog circuit 82 is illustrated in FIG. 7 in a general model. As it is shown, the summing analog circuit 822 includes four mixers 826, 828, 832 and 834, in addition to an error amplifier 824 and a PWM comparator 830 as of a conventional PWM control loop. The first mixer 826 combines a feed-forward signal $LCT_1$ and a reference voltage $V_{ref}$, and outputs its combination into the error amplifier 824. The second mixer 302 combines, in opposite sign, a feed-forward signal $LCT_2$ and a feedback signal $V_{FB1}$ representative of the modulated voltage $V_m$, and outputs its combination into the error amplifier 824. The third mixer 832 combines a feed-forward signal $LCT_3$ and the output $V_{c1}$ of the error amplifier 824, and outputs its combination into the PWM comparator 830. The forth mixer 304 combines, in opposite sign, a feed-forward signal $LCT_4$ and a ramp signal Ramps, and outputs its combination into the PWM comparator 830. The PWM comparator 830 thus outputs the PWM duty clocks 835 with the proper ON-duty $D_{on1}$ to modulate the output $V_m$ of the first stage 72. Generally, the feed-forward signal $V_{c2}$ resulted from the response of the second conversion stage 78 for representing the load current transient (LCT) can be fed into the first conversion stage 75 to adjust the ON-duty $D_{on1}$ thereof by combining with $V_{ref}$, $V_{FB1}$, $V_{c1}$, or Ramps, and they are designated with $LCT_1$ to $LCT_4$ in FIG. 7 to be combined with $V_{ref}$, $V_{FB1}$, $V_{c1}$, and Ramps, respectively, and can be employed individually or combined some or all together to adjust the ON-duty $D_{on1}$ of the first conversion stage 75. More specifically, in the first embodiment summing analog circuit 822, the feed-forward signal $V_{c2}$ can be inputted at anyone, some or all of the four nodes $LCT_1$–$LCT_4$, as long as it is able to adjust the ON-duty $D_{on1}$ of the PWM signal 835 to meet required output $V_m$ of the first stage 72. It is obviously from the circuit 70 shown in FIG. 6 that the feed-forward signal $V_{c2}$ has a value resulted from the response of the second conversion stage 78 to the load current transient, and by means of the above arrangement 822 in FIG. 7, small ripple and peak currents and faster $dI_{L2}/dt$ response could be obtained simultaneously.

Figure 8:
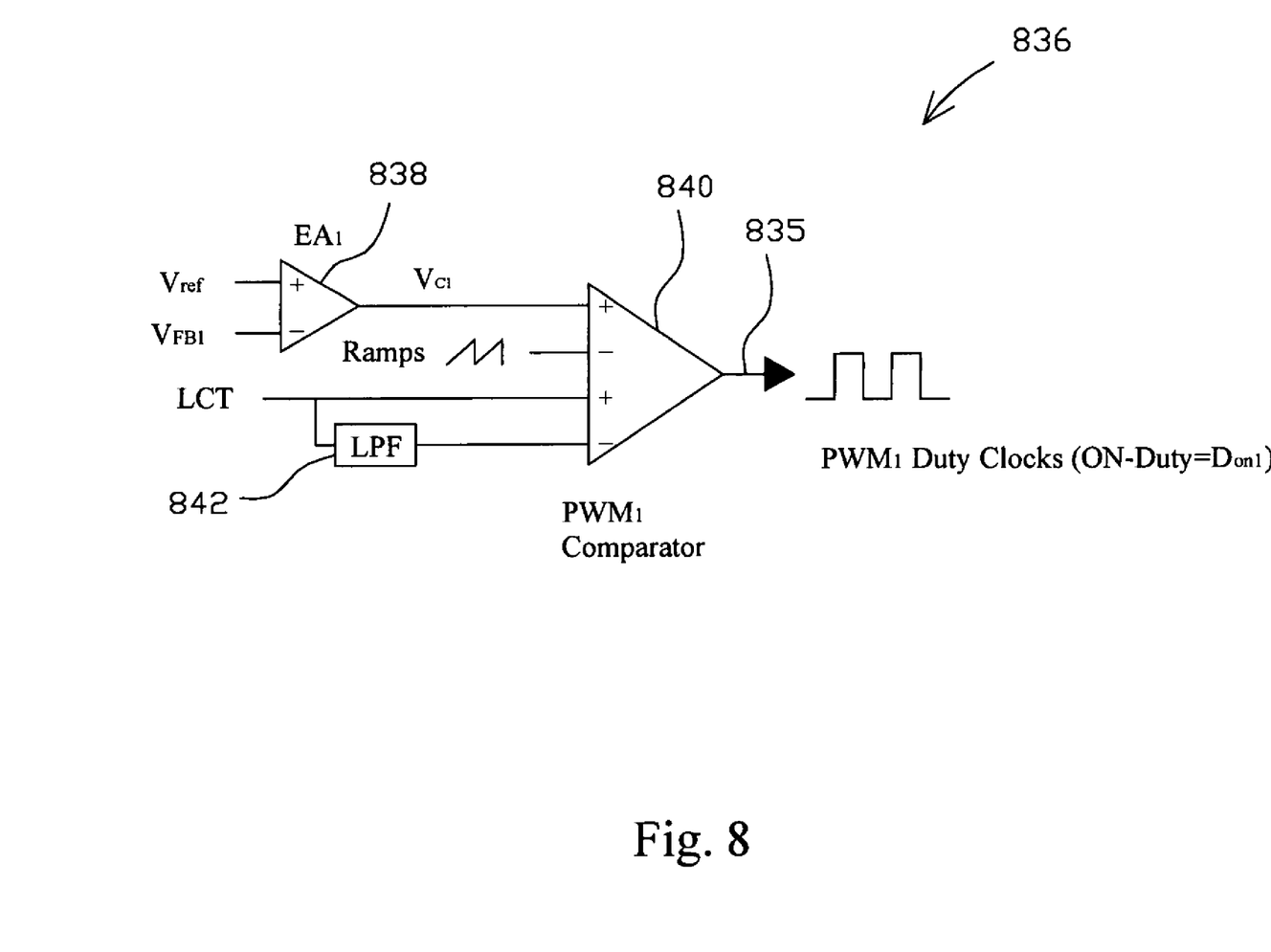
FIG. 8 shows another summing analog circuit for the system shown in FIG. 6.

For alternative embodiment of the summing analog circuit 82 in FIG. 6, as shown in FIG. 8, with the application of multi-input PWM comparator 840 to the PWM control loop of the first conversion stage 75 in FIG. 6, the multi-input PWM comparator 840 has several inputs including the error amp output $V_{c1}$, ramp signal Ramps, LCT and its modified signal generated by passed through a low pass filter (LPF) 842. As in a conventional DC-DC voltage converter, e.g., the PWM control loop 44 shown in FIG. 4, the present error amp output $V_{c1}$ of the summing analog circuit 836 is generated by an error amplifier 838 by comparing the feedback signal $V_{FB1}$ representative of the modulated voltage $V_m$ with the reference voltage $V_{ref}$. Similar to the summing analog circuit 822 of FIG. 7, however, the present feed-forward signal LCT in FIG. 8 is derived from the error amp output $V_{c2}$ of the second conversion stage 78, as shown in FIG. 6. In other words, the error amp output $V_{c2}$ of the second conversion stage 78 is taken into consideration in conjunction with the error amp output $V_{c1}$ of the first conversion stage 75 and Ramps to generate the PWM control signal 835 by the PWM comparator 840 of FIG. 8 in order to modulate the output $V_m$ of the first stage 72. By this embodiment, the ON-duty $D_{on1}$ of the PWM duty clocks 835 for modulating the voltage $V_m$ can also have a quick response to a load current transient happened in the converter output $V_{out}$ of the DC-DC voltage converter 70 in FIG. 6.

Figure 9:
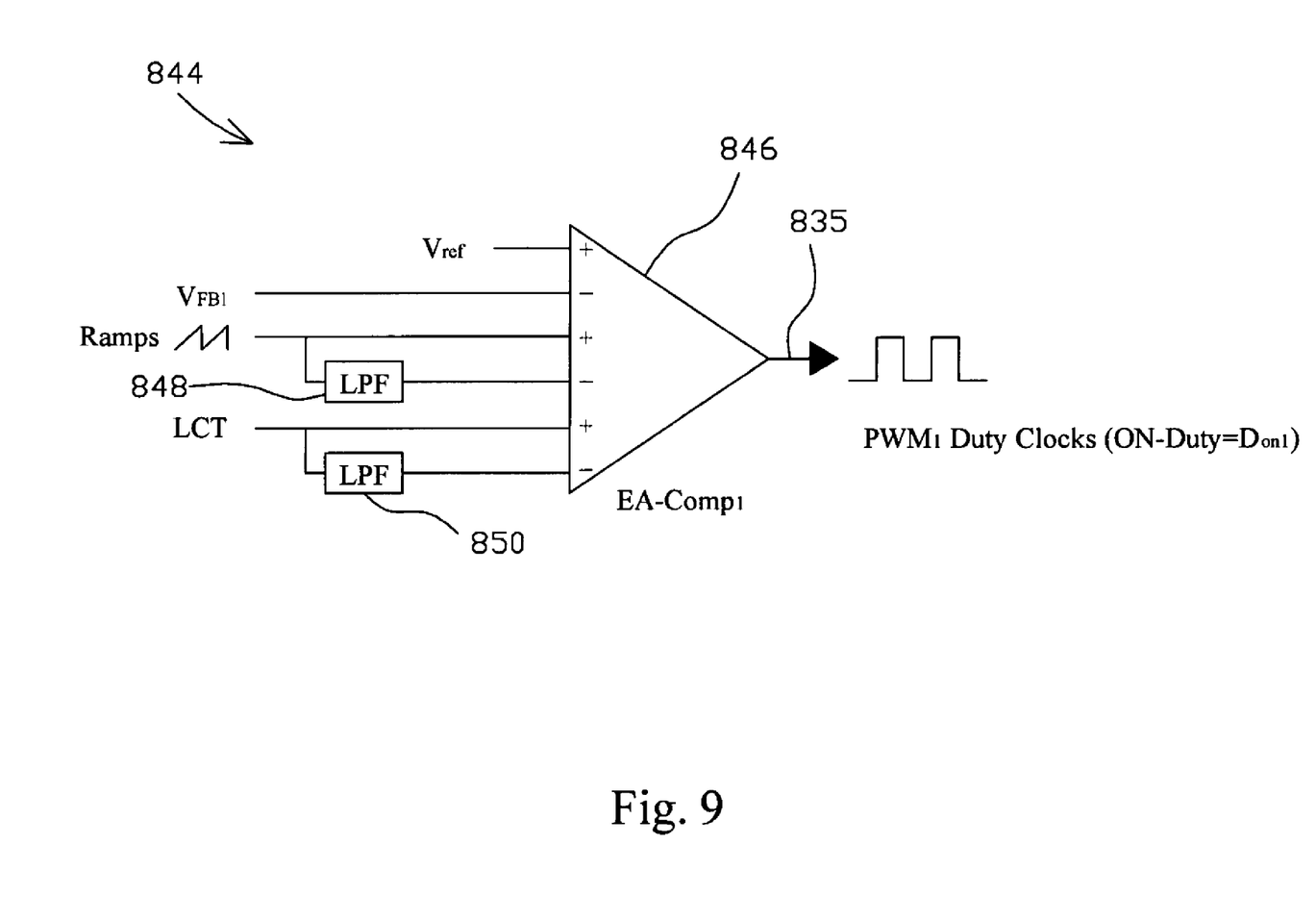
FIG. 9 shows yet another summing analog circuit for the system shown in FIG. 6.

In the third embodiment 844, as shown in FIG. 9, the summing analog circuit 836 of FIG. 8 can be further modified by combining the error amplifier 838 with the PWM comparator 840 to be a multi-input PWM comparator 846 whose inputs includes the reference voltage $V_{ref}$, feedback signal $V_{FB1}$ representative of the modulated voltage $V_m$, ramp signal Ramps and its modified signal generated by passed through a low pass filter 848, and the LCT resulted from the error amp output $V_{c2}$ of the second conversion stage 78 as shown in FIG. 6 and its modified signal generated by passed through a low pass filter 850. The PWM comparator 846 then outputs the PWM duty clocks 835 with the ON-duty $D_{on1}$ to the first conversion stage 75 of FIG. 6 to modulate the output $V_m$ of the first stage 72 in fast response to the load current transient occurred to the converter output $V_{out}$, and thereby improving the system performance.

Load Current Transient Pick-up

Figure 10:
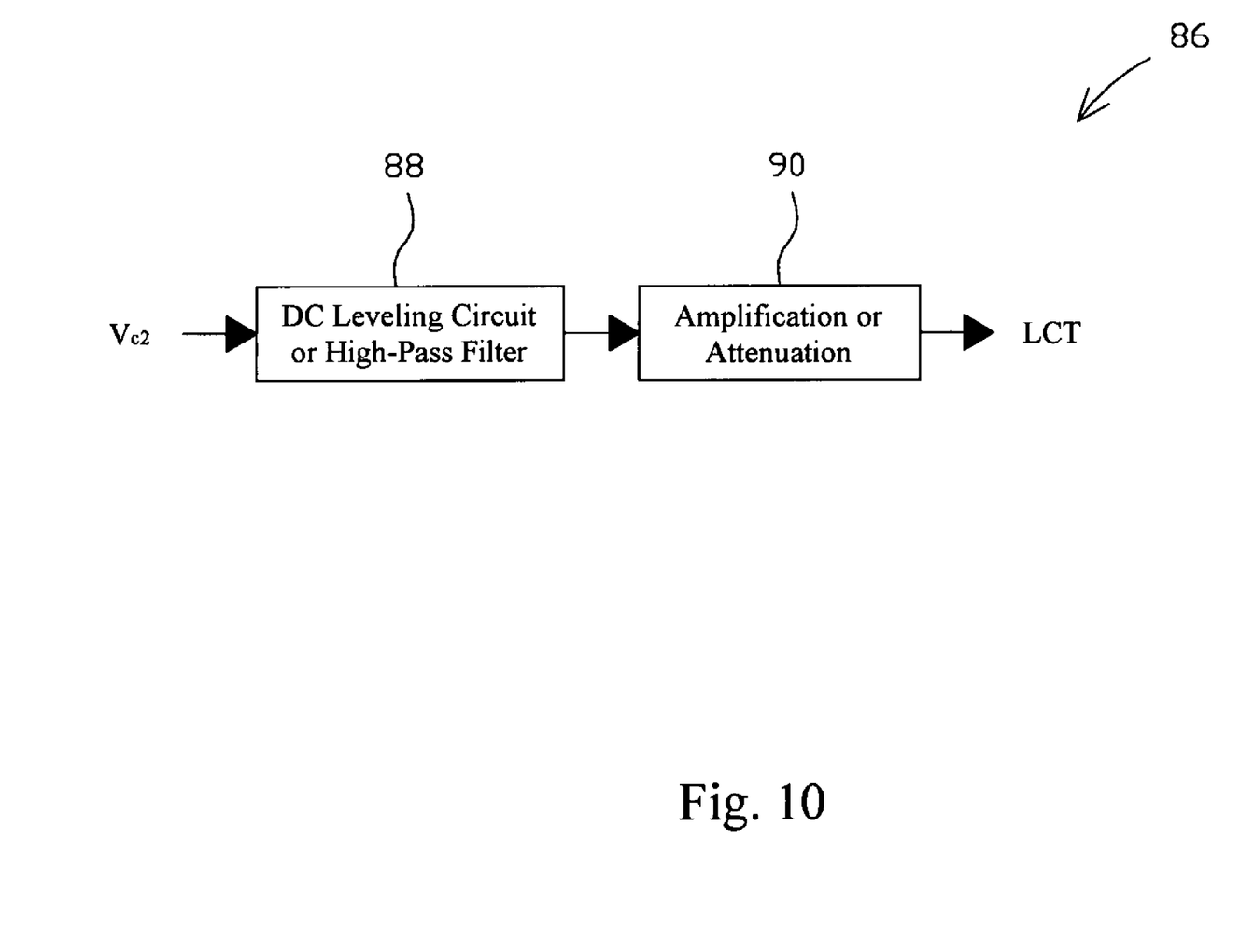
FIG. 10 shows a load current transient pick-up circuit for the summing analog circuit shown in FIGS. 7–9.
Figure 11:
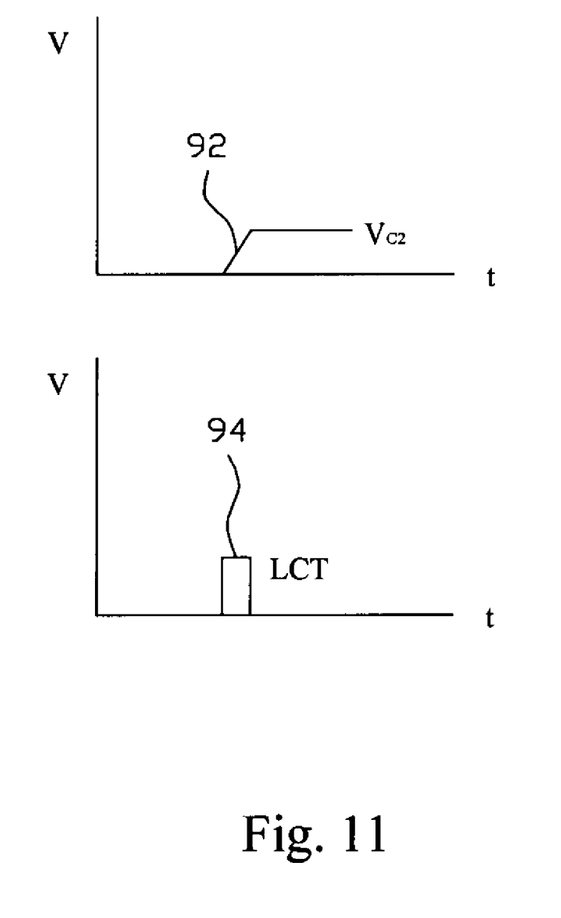
FIG. 11 shows a relationship between the signals $V_{C2}$ and LCT of the circuit shown in FIG. 10.

In the above three summing analog circuitries 822, 836 and 844, the signal LCT, i.e., anyone of $LCT_1$ to $LCT_4$, is derived from the error amp output $V_{c2}$ of the second conversion stage 78 in FIG. 6, to represent the load current transient conditions. FIG. 10 shows an apparatus 86 to generate an LCT signal from $V_{c2}$, which includes a DC leveling circuit or high pass filter (HPF) 88 and an amplification or attenuation block 90. These two circuits 88 and 90 can be designed to have zero output at steady state operations, i.e., the $V_{c2}$ results in a DC level which has no effect on the first conversion stage 75 in steady state operations, and to have a proper output magnitude at load current transient, i.e., a sudden increasing in $V_{c2}$ signal, as shown in FIG. 11. Conceptually, the LCT signal is effective to modulate the voltage $V_m$ by the pulse 94 resulted from the sudden change 92 of $V_{c2}$ in response to the load current transient.

Third Embodiment Output Voltage Drop Feed-Forward (OVDFF) Method

As mentioned in the above, the voltage drop of the converter output $V_{out}$ can also serve as the feed-forward signal to improve the performance. For simplicity, referring to FIG. 6, the signal $V_{c2}$ drawn from the block 78 to the block 75 is replaced with $V_{FB2}$ in this case, which is representative of the converter output voltage $V_{out}$. In addition, the summing analog circuit 82 includes an error amplifier to compare the feed-forward signal $V_{FB2}$ with a reference voltage so as to generate a signal representative of the output voltage drop resulted from the load current transient to be combined with the other signals in the PWM control loop of the block 75 to adjust the ON-duty $D_{on1}$ of the PWM signal 835 for modulating the output $V_m$ of the first stage 72.

In view of the above embodiments and descriptions, when the modulated voltage $V_m$ and inductor $L_2$ of the second stage are properly set up so that the ripple and peak currents of the second stage, i.e., $(1/L_2)(V_m-V_{out})(T_{on})$ and $I_{L2(DC)}+(1/2)(1/L_2)(V_m-V_{out})(T_{on})$, are in acceptable ranges, a DC-DC voltage converter according to the present invention will have both fast load current transient response capability and low ripple and peak currents. This is because of that the $V_{out}$ drop will happen due to an sudden increment or decrement of a load current and that the second stage will respond against the $V_{out}$ drop and thereby generate obviously detectable signals at the same time, such as the "ON-duty increasing or decreasing", "error amp output $V_{c2}$ swinging", ... etc. Thus, the use of such detectable signals will achieve the functions asserted by the present invention.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A feed-forward method for a fast response to a load current transient in a DC-DC power conversion, said method comprising the steps of:
   arranging two or more conversion stages in series for splitting said DC-DC power conversion into a multi-step conversion, each of said conversion stages including an inductive element for generating a respective voltage responsive to a switching signal;
   generating a feed-forward signal from a first stage selected from said two or more conversion stages;
   feeding back said feed-forward signal to a second stage preceding said first stage; and
   modulating said second stage responsive to said feed-forward signal.

2. A feed-forward method according to claim 1, wherein said first stage converts a first voltage to a second voltage using a PWM signal as said switching signal with an ON-duty to generate said second voltage.

3. A feed-forward method according to claim 2, wherein said feed-forward signal is generated from said PWM signal.

4. A feed-forward method according to claim 3, wherein said step of modulating said second stage includes the step of detecting said ON-duty.

5. A feed-forward method according to claim 1, wherein said step of generating a feed-forward signal comprises the steps of:
   converting a first voltage to a second voltage by said first stage;
   generating an error signal by comparing a feedback signal representative of said second voltage with a reference signal within said first stage; and
   generating said feed-forward signal from said error signal.

6. A feed-forward method according to claim 5, further comprising generating an adjusting signal representative of said load current transient from said feed-forward signal.

7. A feed-forward method according to claim 6, wherein said adjusting signal has a constant value at a steady state operation.

8. A feed-forward method according to claim 6, wherein said step of generating an adjusting signal comprises the steps of:
   leveling said feed-forward signal with a constant value; and
   amplifying or attenuating said leveled feed-forward signal.

9. A feed-forward method according to claim 6, wherein said step of modulating said second stage comprises the steps of:
   converting a third voltage to a fourth voltage by said second stage;
   generating a second error signal by comparing a second feedback signal representative of said fourth voltage with a second reference signal within said second stage;
   generating a PWM signal by comparing said second error signal with a ramp signal within said second stage;
   combining said adjusting signal with one or more of said second reference signal, second feedback signal, second error signal and ramp signal for adjusting said PWM signal within said second stage; and
   generating said fourth voltage with said PWM signal.

10. A feed-forward method according to claim 6, wherein said step of modulating said second stage comprises the steps of:
    converting a third voltage to a fourth voltage by said second stage;

generating an error signal by comparing a second feedback signal representative of said fourth voltage with a second reference signal within said second stage;

generating a filtered signal by passing said adjusting signal through a low pass filter;

generating a PWM signal by a multi-input PWM comparator receiving said error signal, a ramp signal, said adjusting signal and filtered signal within said second stage; and generating said fourth voltage with said PWM signal.

11. A feed-forward method according to claim 6, wherein said step of modulating said second stage comprises the steps of:

converting a third voltage to a fourth voltage by said second stage;

generating a second feedback signal representative of said fourth voltage within said second stage;

generating a first filtered signal by passing a ramp signal through a first low pass filter;

generating a second filtered signal by passing said adjusting signal through a second low pass filter;

generating a PWM signal by a multi-input PWM comparator receiving a second reference signal, said second feedback signal, ramp signal, first filtered signal, adjusting signal and second filtered signal within said second stage; and generating said fourth voltage with said PWM signal.

12. A feed-forward method according to claim 1, wherein said step of generating a feed-forward signal comprises the steps of:

converting a first voltage to a second voltage by said first stage; and generating said feed-forward signal by comparing a signal representative of said second voltage with a reference signal.

13. A feed-forward method according to claim 1, wherein said step of modulating said second stage comprises enlarging a difference between an input voltage and output voltage of said first stage.

14. A DC-DC power converter for converting an input voltage to a converter output voltage on a converter output, comprising:

two or more conversion stages connected in series between said input voltage and converter output for converting said input voltage to said converter output voltage step by step, each of said conversion stages including an inductive element for generating a respective voltage responsive to a switching signal;

a first stage selected from said two or more conversion stages for generating an output voltage from a voltage input to said first stage, said first stage including a control circuit for generating a feed-forward signal responsive to a feedback signal of an output parameter of said first stage; and a second stage preceding said first stage for generating said voltage input to said first stage responsive to said feed-forward signal.

15. A DC-DC power converter according to claim 14, wherein said control circuit of said first stage comprises a PWM control loop for generating a PWM signal with an ON-duty to modulate said first stage.

16. A DC-DC power converter according to claim 15, wherein said control circuit of said first stage further comprises means for generating said feed-forward signal from said PWM signal.

17. A DC-DC power converter according to claim 16, wherein said second stage comprises a detecting logic for detecting said ON-duty.

18. A DC-DC power converter according to claim 14, wherein said control circuit of said first stage comprises:

an error amplifier for generating an error signal by comparing said feedback signal with a reference signal within said first stage, said feedback signal being representative of said output voltage of said first stage; and means for generating said feed-forward signal from said error signal.

19. A DC-DC power converter according to claim 18, wherein said second stage comprises a summing analog circuit for receiving said feed-forward signal.

20. A DC-DC power converter according to claim 19, wherein said summing analog circuit comprises means for generating an adjusting signal representative of said load current transient from said feed-forward signal.

21. A DC-DC power convener according to claim 20, wherein said adjusting signal has a constant value at a steady state operation.

22. A DC-DC power converter according to claim 19, wherein said summing analog circuit comprises:

a DC leveling circuit for generating a leveled signal from said feed-forward signal; and an amplifier or attenuator for amplifying or attenuating said leveled signal to thereby obtain an adjusting signal.

23. A DC-DC power convener according to claim 20, wherein said summing analog circuit comprises:

an error amplifier for generating a second error signal by comparing a second feedback signal representative of a second stage output voltage of said second stage with a second reference signal;

a PWM comparator for generating a PWM signal by comparing said second error signal with a ramp signal for modulating said second stage output voltage; and means for combining said adjusting signal with one or more of said second reference signal, second feedback signal, second error signal and ramp signal for adjusting said PWM signal.

24. A DC-DC power converter according to claim 20, wherein said summing analog circuit comprises:

an error amplifier for generating a second error signal by comparing a second feedback signal representative of a second stage output voltage of said second stage with a second reference signal;

a low pass filter for filtering said adjusting signal to thereby generate a filtered signal; and a multi-input PWM comparator receiving said error signal, a ramp signal, said adjusting signal and filtered signal for generating a PWM signal to modulate said second stage output voltage.

25. A DC-DC power converter according to claim 20, wherein said summing analog circuit comprises:

a second reference signal;

a second feedback signal representative of a second stage output voltage of said second stage;

a ramp signal;

a first low pass filter for filtering said ramp signal to thereby generate a first filtered signal;

a second low pass filter for filtering said adjusting signal to thereby generate a second filtered signal; and a multi-input PWM comparator receiving said second reference signal, second feedback signal, ramp signal, first filtered signal, adjusting signal and second filtered signal for generating a PWM signal to modulate said second stage output voltage.

26. A DC-DC power converter according to claim 14, wherein said control circuit of said first stage comprises means for generating said feed-forward signal by comparing said feedback signal with a reference signal, said feedback signal being representative of said output voltage of said first stage.

27. A method for improving a response speed of a DC-DC voltage converter to a load current transient, said DC-DC voltage converter including two or more conversion stages connected in series between an input voltage and a converter output for converting said input voltage to a converter output voltage step by step, each of said conversion stages including an inductive element for generating a respective voltage responsive to a switching signal, said method comprising the steps of;

selecting a first stage and a second stage preceding said first stage from said two or more conversion stages;

coupling a signal corresponding to said load current transient from said first stage to said second stage; and modulating said second stage with said signal for increasing a stage input voltage and an output voltage of said first stage.

28. In a DC-DC voltage converter including two or more conversion stages connected in series between an input voltage and a converter output for converting said input voltage to a converter output voltage step by step, each of said conversion stages including an inductive element for generating a respective voltage responsive to a switching signal, the improvement comprising:

a signal corresponding to a load current transient obtained from a first stage among said two or more conversion stages being coupled to a second stage that is preceding said first stage for modulating said second stage so as to increase a stage input voltage and an output voltage of said first stage.

* * * * *